3,563,066
SPREADING MECHANISM FOR HIDES, SKINS, OR LEATHER

Karel Baják, Jan Zdražil, and Miroslav Sparel, Krnov, Czechoslovakia, assignors to Strojosvit, narodni podnik, Krnov, Czechoslovakia
Filed Nov. 27, 1968, Ser. No. 779,569
Int. Cl. C14b 1/08
U.S. Cl. 69—1                                    5 Claims

ABSTRACT OF THE DISCLOSURE

A spreading mechanism for feeding tanned hides or skins to a fluffer has a conveying belt and paired spreading rollers freely rotatable on shafts held between chains. The chains are driven in such a manner that the rollers move along a carrier face of the belt against the direction of movement of the latter. The rollers of each pair have circumferential engaging ribs, and the ribs are moved axially apart by engagement of abutments on the rollers and the faces of a wedge shaped cam while the rollers move along the carrier face.

BACKGROUND OF THE INVENTION

This invention relates to spreading mechanism for flat, pliable objects, such as hides, skins, or leather, of the type used in the tanning and leather finishing industry.

The invention will be described hereinafter with specific reference to a fluffing machine, but the problem of spreading a hide, skin, or piece of leather prior to presenting the work piece to motor-driven operating tools is present in many similar machines.

The relatively pliable work pieces presented to the rotating fluffer in a fluffing machine tends to contract transversely of its direction of movement toward the fluer, and thus to develop ridges or a corrugated configuration. If this condition is not remedied promptly, the ridges may be ground away by the fluffer to produce holes in the work piece. Conventional fluffing machines must be watched carefully, and they must be opened and the work piece straightened out by hand before defects are caused.

The output of such machines is much smaller than would be expected from the normal feeding rate, and each machine requires the constant attendance of a highly skilled operator.

Attempts have been made to provide fluffing machines and similar equipment with spreading mechanisms which spread the work piece flat under some transverse tension, and hold it in the flat and tensioned condition until it comes within range of the tools. The existing spreading devices are not entirely saitsfactory. Some of them are suitable only for work pieces which may be bent in an arcuate path without suffering damage, and are not suitable for stiffer grades of leather. Others prevent any intervention of the operator after the work piece has entered the machine. Such arrangements are not suitable for trimmed work pieces having relatively straight edges.

Yet other known spreading mechanisms are provided with two spreading rollers having helical engaging ribs and arranged for rotation about spaced axes parallel to the direction of work piece movement. This arrangement is not suitable for skins and leather made therefrom in which paws and other narrow parts project laterally from the bulk of the work piece. The narrow projecting elements are not effectively straightened and tensioned, and are apt to curl over the spreading rollers.

A primary object of the invention is the provision of a spreading mechanism for use with leather, hides, or skins, which is suitable for workpieces of any simple or complex configuration, and which is readily adapted to a wide variety of work piece properties.

SUMMARY OF THE INVENTION

With this object and others in view, as will hereinafter become apparent, the invention provides a spreading mechanism equipped with a conveying member which forms a continuous loop, has a carrier face directed outward of the loop, and is normally driven in the loop in a predetermined direction. Spreading rollers are moved along a portion of the carrier face in a direction opposite to the direction of conveyor movement while they are free to rotate about respective axes transverse of the afore-mentioned directions of movement. The rollers include a pair of rollers which have respective circumferential engaging means and are guided axially relative to each other during their movement along the afore-mentioned portion of the carrier face in such a manner that the respective engaging means move axially away from each other while being held in contact with a work piece carried on the carrier face.

Other features, additional objects, and many of the attendant advantages of this invention will be appreciated readily as the same becomes better understood by reference to the following detailed description of a preferred embodiment when considered in connection with the appended drawings.

DESCRIPTION OF THE PREFERRED EMBODIMENT

Figure 1:
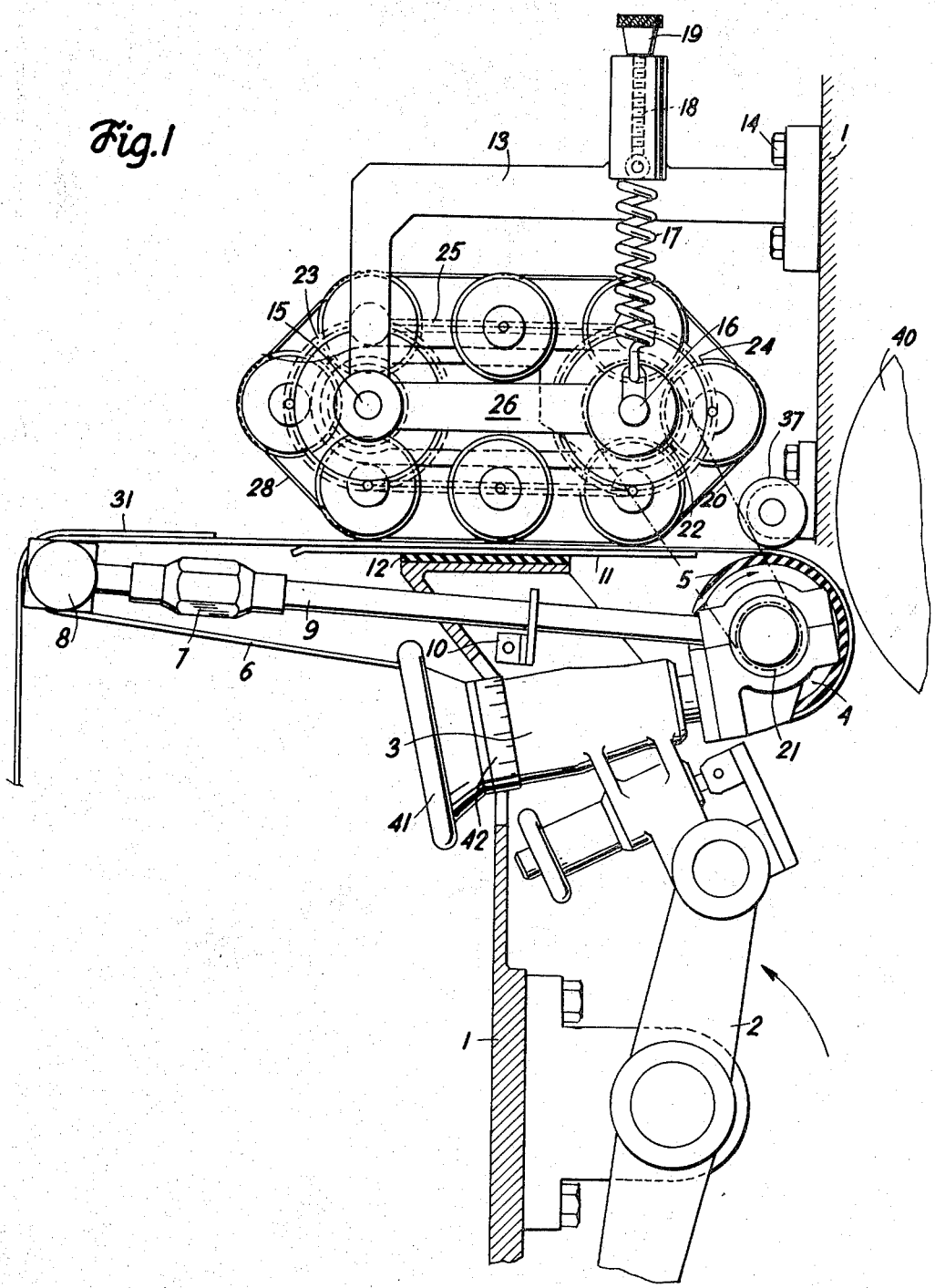
FIG. 1 shows a leather fluffing machine equipped with the spreading mechanism of the invention in fragmentary side elevation.

Referring now to the drawings in detail, and initially to FIG. 1, there is seen only as much of a fluffing machine as is needed for an understanding of the invention, the machine being otherwise conventional. A partly shown fluffer 40 is mounted on the stationary frame 1 of the machine for rotation about a horizontal axis and is motor-driven in a manner not further illustrated.

Arms 2 of which only one is seen in the drawing are pivotally fastened to the machine frame 1 and carry an adjustment mechanism 3 which permits a wide pulley or drum 4 to be shifted on the arms 2 toward and away from the fluffer 40. An electric drive motor, not shown, rotates the pulley 4 clockwise, as viewed in the drawings, during operation of the machine. The cylindrical face of the pulley 4 is covered by a resilient foam rubber sleeve 5.

A conveying belt 6 of reinforced, but pliable rubber is trained in a continuous loop over the driven pulley 4 and a tensioning pulley 8 whose bearings are connected to the bearings of the pulley 4 on the adjusting mechanism 3 by stays 9 whose effective length can be adjusted by means of turnbuckles 7. The stays 9 are slidably received in guide lugs 10 on the frame 1. The arms also carry a rigid backing plate 11 mounted on rubber pads 12 under the upper, approximately horizontal strand of the belt 6 opposite the upwardly directed carrier face of the belt.

A portion of the spreading mechanism of the fluffing machine is mounted above the plate 11 and the belt 6 on a bracket 13 attached to the machine frame 1 by bolts 14. A front shaft 15 of the mechanism is journaled in the bracket 13. The bearings of a rear shaft 16 are suspended from the bracket 13 by means of helical springs 17 whose tension can be adjusted by means of threaded spindles 18 and nuts 19 on the spindles.

The rear shaft 16 is driven by means of a V-belt 20 trained over pulleys 21, 22 on the pulley 4 and the shaft 16 respectively. The belt 20 is held taut by the springs 17. The shafts 15, 16 are connected by pairs of sprockets 23, 24 connected by the closed loops of two link belts 25, only one sprocket 23, 24 on each shaft 15, 16 and one of the connecting link chains 25 are seen in FIG. 1. The two sprockets associated with each shaft are mounted near respective axial ends of the shaft. The shafts are held at a constant distance by stays 26 pivoted on the shaft 15.

Figure 2:
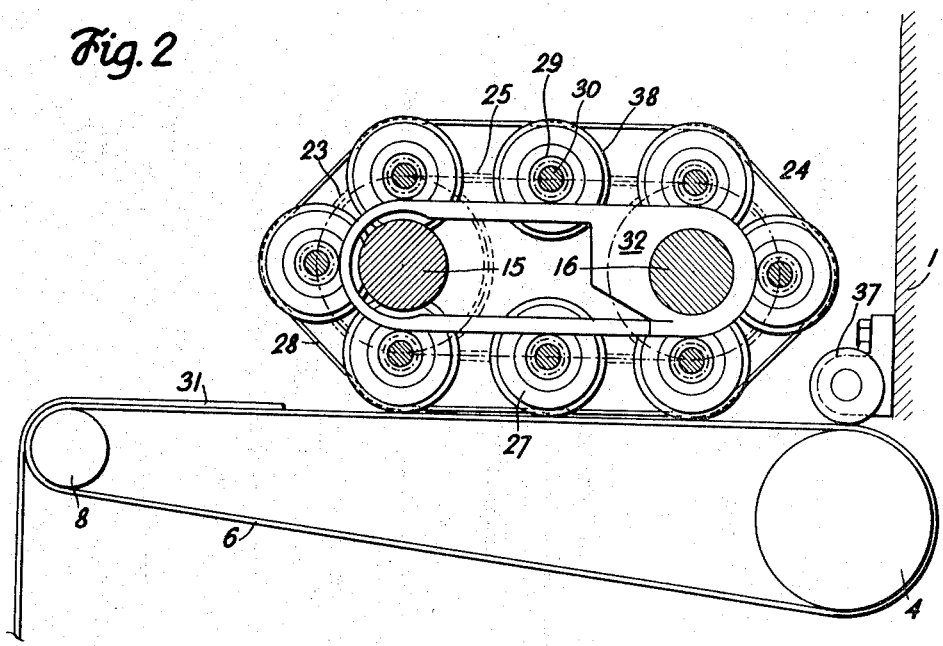
FIG. 2 shows operating elements of the apparatus of FIG. 1 in sectional side elevation on the line II—II in FIG. 3.
Figure 3:
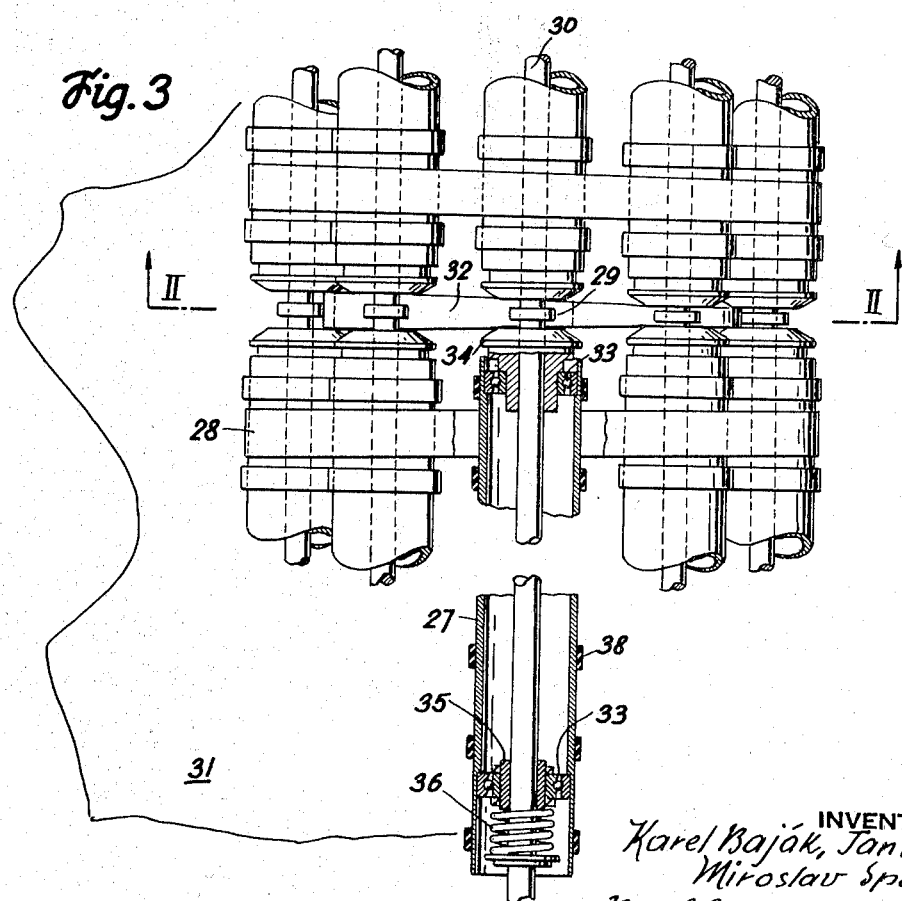
FIG. 3 shows a portion of the apparatus of FIG. 1 in plan view, and partly in section.

As is better seen in FIGS. 2 and 3, the chains 25 are transversely connected by eight shafts 30 which each carry a pair of axially offset spreading rollers 27. The chains 25 and the rollers 27 move clockwise about the shafts 15, 16 and the stays 26 during operation of the machine. A narrow, resilient, transmission belt 28 is trained over each of the groups of eight rollers 27 between axially spaced, circumferential rubber ribs 38 on the rollers 27.

Each shaft 30 carries a coaxial ball bearing 29 on its middle portion. The ball bearings 29 roll along the circumference of an upright guide plate 32 suspended between the bearings 29 when the chains 25 are driven. The guide plate 32 is a wedge-shaped cam, being thicker near the front shaft 15 and thinner near the rear shaft 16, the shafts 15, 16 passing through openings in the plate 32, as is best seen in FIG. 2.

The rollers 27 are freely rotatable on the associated shafts 30. As is partly seen in FIG. 3, each roller 27 is tubular and is provided internally with two ball bearings 33 near its axial ends. Sleeves 34, 35 mounted on the inner races of the bearings 33 are axially slidable on the shaft 30. The sleeve 34 projects from the roller 27 toward the guide plate 32 and is held in abutting engagement with the guide plate by a helical compression spring 36 interposed between the sleeve 35 and a collar on the shaft 30. The roller 27 is provided with internal shoulders against which the bearing 33 seats, thereby allowing the spring 36 to bias the sleeve 34. During the clockwise movement of the shafts 30 and rollers 27 about the guide plate 32, the rollers 27 which are in contact with the conveying belt 6 or a piece of leather 31 supported thereon are turned counterclockwise about the associated shafts 30 by frictional engagement with the belt 6 or the leather 31, and this movement is transmitted to the other rollers 27 by the belts 28.

A piece of leather 31 fed to the nip between the belt 6 and the frontmost pair of rollers 27 is gripped between the rollers 27 and the belt 6 and moved along the flat supporting plate 11 toward the fluffer 40. There is no relative movement between the leather piece 31, the belt 6, and the rollers 27 in the direction of movement of the belt 6. The rollers 27 merely roll on the leather piece.

While being moved on the chains 25 in a straight path from the fluffer 40 toward the tensioning pulley 8 along the belt 6, the two pulleys 27 on each shaft 30 are pushed apart against the restraint of their springs 36 by the camming engagement between respective faces of the guide plate 32 and the sleeves 34. The resulting axial movement of the ribs 38 on the rollers 27 causes the leather piece 31 engaged by the ribs to be spread out laterally on the belt 6 as it moves toward an idler 37 adjacent the driven pulley 4. The leather piece 31 is normally fully spread out when it reaches the idler 37 and moves on to the fluffer 40.

After having been lifted from the belt 6 by the chains 25 during movement about the front shaft 15, the rollers 27 on each shaft 30 approach each other as the sleeves 34 travel toward the thin part of the guide plate 32. The rollers 27 are at a minimum distance from each other when again approaching the belt 6 near the driven pulley 4.

If it should become necessary to withdraw a leather piece from the spreading area, the arms 2 are swung counterclockwise from the position illustrated in FIG. 1. The pulley 4 is thereby moved toward the left and away from the fluffer 40. The normally obliquely inclined belt 20 is shifted to a more vertical position and permits the springs 17 to pivot the rear shaft 16 and all elements mounted thereon counterclockwise or upward about the shaft 15. The tensioning pulley 8 is simultaneously moved downward from the position seen in FIG. 1. Whereas the belt 6 or a piece of leather 31 carried on the belt is normally in tangential abutting engagement with the rollers 27 on the lower strands of the chains 25, a gap is opened between the belt 6 and the spreading mechanism over the entire effective length of the latter. A piece of leather may readily be withdrawn from the machine.

The mechanism which normally holds the belt 6 in the illustrated position and which permits the belt to be swung counterclockwise, as indicated by an arcuate arrow in FIG. 1, is represented in the drawings only by the arms 2. It includes non-illustrated springs biasing the arms toward the illustrated position and a releasing pedal under the operator's control and connected to the arms by a linkage. The operative position of the arms 2 shown in FIG. 1 is determined by abutting engagement of the belt 6 with the fluffer 40, an idler roller 37 journaled in the machine frame 1 between the fluffer and the spreading mechanism, and the rollers 27 on the lower strands of the chains 25. The abuttingly engaged portions of the belt 6 are backed by the driven pulley 4 and the plate 11, but can yield as needed to accommodate a leather piece, tanned skin or hide 31 due to the resiliency of the sleeve 5 and the pads 12. The effect of the fluffer 40 on the leather can be set by means of the adjusting mechanism 3 whose principal element is a threaded feed spindle (not seen) equipped with a handwheel 41 and an engraved scale 42 on the wheel.

While a reasonable spreading effect can be achieved with an apparatus in which at least one pair of rollers 27 engages the leather piece 31 during its travel over the plate, a much better effect is achieved with the illustrated arrangement in which at least two, and mostly three roller pairs simultaneously engage the leather. The spread-out condition of the latter is maintained during transfer from the spreading mechanism to the fluffer 40 by the idler 37.

The path of the rollers 27 and the number of rollers in simultaneous spreading engagement with a leather piece can be varied in the illustrated apparatus by replacing the guide plate 32 by one having different overall dimensions and a different contour. Further variations in the operating characteristics of the spreading mechanism can be brought about by replacing the V-belt pulleys 21, 22 and by thereby changing the ratio between the linear velocities of the belt 6 and of the operative rollers 27. Further adjustment to the properties of the treated leather pieces 31 may be had by selecting a belt 6, a sleeve 5, and pads 12 of desired elastic properties.

An actual embodiment of the machine described above has been found very versatile and effective in the handling of leather pieces having a simple or a fairly complex outline. Intervention of an operator is held to a minimum, and the need for opening the machine and releasing a piece of leather before it reaches the fluffer 40 seldom arises if the leather is presented to the front nip of the spreading mechanism with reasonable care by an operator of minimal skill.

The spreading mechanism of the invention has been described above in its application to a fluffing machine. It will be appreciated, however, that it is useful in any other leather making or finishing machine in which a hide, skin, or piece of leather has to be presented to working tools without creases and in a uniformly tensioned condition.

We claim:

1. In a spreading mechanism, in combination:

(a) a conveying member forming a continuous loop and having a carrier face directed outward of said loop and adapted to carry a work piece;
(b) drive means for moving said member in said loop in a predetermined direction;
(c) a plurality of spreading rollers;
(d) actuating means for moving said spreading rollers along a portion of said carrier face in a direction opposite to said predetermined direction while the rollers are free to rotate about respective axes transverse of said directions,
  (1) said rollers including a pair of rollers,
  (2) the rollers of said pair having respective circumferential engaging means;
(e) guide means for guiding the rollers of said pair axially relative to each other during movement of the same along said portion of said carrier face in a manner to move the respective engaging means axially away from each other; and
(f) holding means for holding said engaging means in contact with a work piece carried on said carrier face.

2. In a mechanism as set forth in claim 1, said conveying member being pliable, and normally stationary backing means movably engaging a face of said conveying member opposite said portion of said carrier face.

3. In a mechanism as set forth in claim 1, said actuating means including chain means extending in a closed loop, said drive means including means for moving said chain means in the loop thereof, a plurality of shafts extending from said chain means transversely of the direction of movement of the same, each shaft carrying a pair of said rollers.

4. In a mechanism as set forth in claim 3, said guide means including a cam member having two cam faces extending in said predetermined direction and spaced from each other in the direction of said axes, the spacing of said cam faces increasing in said opposite direction, abutment means on each roller axially engageable with one of said cam faces, and yieldable means holding said abutment means in engagement with the associated cam face while the roller is moved along said portion of said carrier face by said actuating means.

5. In a mechanism as set forth in claim 1, releasing means for releasing said holding means and for thereby opening a gap between said conveying member and said rollers, said gap extending over said portion of said carrier face.

References Cited
UNITED STATES PATENTS

| | | | |
|---|---|---|---|
| 335,197 | 2/1886 | Hoffman | 69—41 |
| 1,380,760 | 6/1921 | Whitney | 69—1 |
| 2,038,050 | 4/1936 | Long | 38—9 |
| 2,624,138 | 1/1953 | Taylor | 38—143 |
| 2,664,731 | 1/1954 | Griffin | 69—1 |
| 3,464,131 | 9/1969 | McCabe | 38—143 |

ALFRED R. GUEST, Primary Examiner

U.S Cl. X.R.

38—143; 69—41